US012782194B2

(12) United States Patent
Scheunders et al.

(10) Patent No.: US 12,782,194 B2
(45) Date of Patent: Nov. 3, 2026

(54) DETERMINING WATER CONTENT IN A POROUS MATERIAL

(71) Applicant: Universiteit Antwerpen, Antwerp (BE)

(72) Inventors: Paul Scheunders, Antwerp (BE); Bikram Koirala, Antwerp (BE)

(73) Assignee: Universiteit Antwerpen, Antwerp (BE)

( * ) Notice: Subject to any disclaimer, the term of this patent is extended or adjusted under 35 U.S.C. 154(b) by 125 days.

(21) Appl. No.: 18/975,001

(22) Filed: Dec. 10, 2024

(65) Prior Publication Data

US 2025/0198846 A1 Jun. 19, 2025

(30) Foreign Application Priority Data

Dec. 15, 2023 (EP) .................................... 23217004

(51) Int. Cl.
*G01J 3/42* (2006.01)
*G01J 3/28* (2006.01)

(52) U.S. Cl.
CPC ............... *G01J 3/42* (2013.01); *G01J 3/2823* (2013.01); *G01J 2003/283* (2013.01); *G01J 2003/425* (2013.01)

(58) Field of Classification Search
CPC ...... G01J 3/42; G01J 3/2823; G01J 2003/283; G01J 2003/425; G01N 21/3563; G01N 21/3554; G01N 21/359; G01N 33/18
See application file for complete search history.

(56) References Cited

PUBLICATIONS

B. Koirala, Z. Zahiri and P. Scheunders, "A Robust Supervised Method for Estimating Soil Moisture Content From Spectral Reflectance," in IEEE Transactions on Geoscience and Remote Sensing, vol. 60, pp. 1-13, 2022, Art No. 5539813, doi: 10.1109/TGRS.2022.3212600. (Year: 2022).*

Datta, D.; Paul, M.; Murshed, M.; Teng, S.W.; Schmidtke, L. Soil Moisture, Organic Carbon, and Nitrogen Content Prediction with Hyperspectral Data Using Regression Models. Sensors 2022, 22, 7998. https://doi.org/10.3390/s22207998 (Year: 2022).*

K. V. Jambhali, B. Koirala, Z. Bnoulkacem and P. Scheunders, "Soil Moisture Content Estimation from Hyperspectral Remote Sensing Data," 2023 13th Workshop on Hyperspectral Imaging and Signal Processing: Evolution in Remote Sensing (WHISPERS), Athens, Greece, 2023, pp. 1-5. (Year: 2023).*

* cited by examiner

*Primary Examiner* — Tarifur R Chowdhury
*Assistant Examiner* — Paul Schnase
(74) *Attorney, Agent, or Firm* — IPSILON USA, LLP

(57) ABSTRACT

A computer-implemented method for determining water content of a moist sample of porous material from a spectral reflectance spectrum of the moist sample is provided. The method includes obtaining (201) a hyperspectral measurement of the moist sample having the spectral reflectance spectrum (212), and a spectral response function (211) associated with the hyperspectral measurement; and determining (202) a water-layer thickness (215) within the moist sample based on the spectral response function, the spectral reflectance spectrum of the moist sample, a spectral reflectance spectrum of an air-dried sample of the porous material, and an absorption spectrum of water. The water content of the moist sample (221) is determined according to a first predetermined relationship (220) or a second predetermined relationship (230) based on (203) the water-layer thickness within the moist sample.

16 Claims, 7 Drawing Sheets

DETERMINING WATER CONTENT IN A POROUS MATERIAL

RELATED APPLICATION

This application claims the benefit of priority from European Patent Application No. 23 217 004.3, filed on Dec. 15, 2023, the entirety of which is incorporated by reference.

FIELD OF THE INVENTION

The present invention generally relates to determining water content in a porous material from spectral reflectance data.

BACKGROUND OF THE INVENTION

The water content or moisture content in a material is typically determined by destructive testing methods such as, for example, gravimetric analysis. Herein, the mass of a moist sample of the material is compared with the mass of the same sample after drying it completely, e.g. by applying heat. The water content of the moist sample can then be determined based on the weight difference between the moist sample and the dried sample. This has the problem that the sample is unusable after testing, and that testing is time-consuming. As such, destructive testing is unsuitable for industrial applications where continuous monitoring of the water content in material samples is desired, e.g. for monitoring the water content of clay bricks moving on a conveyor belt in a brickworks.

Non-destructive testing methods are available that are, for example, based on the electrical resistance of the sample, the surface temperature of the sample, the dielectric permittivity of the sample, or the reflectance of the sample. It is a problem that the accuracy of these non-destructive testing methods is low, and that these testing methods may involve inserting a probe or sensor in the moist sample.

As such, machine learning is sometimes implemented to improve the accuracy of these non-destructive testing methods. This has the problem that substantial training and calibrating is required to obtain a reliable and accurate machine learning model, which may have to be repeated when determining the water content of a different material. This training and calibrating is time-consuming and costly as the water content of a substantial amount of training samples is typically determined by destructive testing methods to establish a ground truth water content.

SUMMARY OF THE INVENTION

It is an object of the present invention, amongst others, to solve or alleviate the above identified problems and challenges by providing a non-destructive method for accurately determining the water content of a moist sample with limited training and calibrating.

According to a first aspect, this object is achieved by a computer-implemented method for determining water content of a moist sample of porous material from a spectral reflectance spectrum of the moist sample. The computer-implemented method comprises:

obtaining a hyperspectral measurement of the moist sample comprising the spectral reflectance spectrum, and a spectral response function associated with the hyperspectral measurement;

determining a water-layer thickness within the moist sample based on the spectral response function, the spectral reflectance spectrum of the moist sample, a spectral reflectance spectrum of an air-dried sample of the porous material, and an absorption spectrum of water;

if the water-layer thickness within the moist sample is at least equal to a minimum water-layer thickness of a minimally moist sample of the porous material with a minimum water content, and at most equal to a maximum water-layer thickness of a maximally moist sample of the porous material with a maximum water content; determining the water content of the moist sample based on the spectral reflectance spectrum of the moist sample, the minimum water content, the maximum water content, a spectral reflectance spectrum of the minimally moist sample, and a spectral reflectance spectrum of the maximally moist sample according to a first predetermined relationship; and if the water-layer thickness is larger than the maximum water-layer thickness, or smaller than the minimum water-layer thickness: determining the water content of the moist sample based on the spectral reflectance spectrum of the moist sample, the minimum water content, the maximum water content, the spectral reflectance spectrum of the minimally moist sample, and the spectral reflectance spectrum of the maximally moist sample according to a second predetermined relationship.

The porous material may be a material comprising pores or void spaces within its structure that can be filled with an other substance, e.g. air, a fluid, or a gas; and that has a substantially linear relationship between the water content within the sample and a thickness of a water layer within the porous material. The water-layer thickness within a moist sample refers to the thickness of the layer of water adsorbed or held by the porous material within its pore structure, i.e. a thin layer surrounding the solid particles within the pores. The porous material may be a natural porous material such as, for example, soil, sandstone, limestone, or wood. The porous material may also be a man-made porous material such as, for example, a foam rubber, a foam plastic, aerated concrete, clay, a ceramic, or a synthetic sponge material. A moist sample may refer to a sample having a degree of wetness or water content that is more than dry but not excessively wet or saturated.

A spectral response function, SRF, describes the sensitivity of a hyperspectral measurement system to radiation at a particular wavelength. The spectral response function associated with the hyperspectral measurement is thus indicative for the sensitivity of a hyperspectral measurement system used to obtain the hyperspectral measurement of the sample at various wavelengths. A hyperspectral measurement system may, for example, be a spectrometer, a spectroradiometer, or a hyperspectral camera.

The input of the computer-implemented method includes a hyperspectral measurement of the moist sample from which the spectral reflectance spectrum of the moist sample is obtained. The input further includes the spectral response function associated with the hyperspectral measurement, i.e. the spectral response function of the hyperspectral measurement system used to measure the spectral reflectance of the moist sample.

The computer-implemented method allows determining the water content of the moist sample from these inputs based on a limited amount of initialization data, i.e. the absorption spectrum of water, a spectral reflectance spectrum of an air-dried sample of the porous material, a minimum water-layer thickness of a minimally moist sample of the porous material, a maximum water-layer thickness of a maximally moist sample, the minimum water content of the minimally moist sample, and the maximum water content of the maximally moist sample. It is an advantage that this initialization data can be obtained by a limited amount of initialization measurements, e.g. by obtaining respective hyperspectral measurements of the air-dried sample, the minimally moist sample and the maximally moist sample; by determining the minimum water content of the minimally moist sample; and by determining the maximum water content by of the maximally moist sample. The air-dried sample of the porous material may be a sample that is dried without the application of external heat, e.g. by allowing the sample to dry at room temperature through natural circulation of air.

The spectral reflectance spectrum of the same sample can vary substantially when obtained by different hyperspectral measurement systems due to differences in sensitivities to radiation at particular wavelengths of the respective systems. As such, determining the water-layer thickness within the moist sample based on the signal response function associated with the hyperspectral measurement allows determining the water-layer thickness accurately regardless of the used hyperspectral measurement system. It is thus an advantage that the computer-implemented method can determine water content within a moist sample of porous material from spectral reflectance spectra obtained by different hyperspectral measurement systems.

The water content in the moist sample is then determined according to a first predetermined relationship or a second predetermined relationship. The first or second predetermined relationship is selected based on the determined water-layer thickness within the moist sample relative to the minimum water-layer thickness and the maximum water-layer thickness. The first and second predetermined relationships may respectively be an interpolation and an extrapolation of the water content of the moist sample based on the spectral reflectance spectrum of the moist sample, the spectral reflectance spectrum of the minimally moist sample, the spectral reflectance spectrum of the maximally moist sample, the minimum water content, and the maximum water content.

This allows determining the water content of the moist sample without substantial calibrating or initializing, and without training a machine learning model. This has the advantage that the computer-implemented method is time-efficient, as testing a substantial amount of samples of the porous material can be avoided. It is a further advantage that the costs associated with determining the water content in moist samples of porous material can be reduced, as determining the water content according to the computer-implemented method is non-destructive, non-invasive, and only a limited amount of samples are needed for initialization. It is a further advantage that the computer-implemented method can be used for continuous monitoring of porous material samples, e.g. for monitoring the water content of clay bricks moving on a conveyor belt within a brickworks.

According to an example embodiment, the computer-implemented method may further comprise determining a normalized sample spectrum, a lower normalized spectrum, and an upper normalized spectrum by respectively projecting the spectral reflectance spectrum of the moist sample, the spectral reflectance spectrum of the minimally moist sample, and the spectral reflectance spectrum of the maximally moist sample on a unit hypersphere.

The unit hypersphere refers to a mathematical concept representing a sphere in n-dimensional space, where each point on the sphere is at a fixed distance of one unit from the origin. The normalized sample spectrum, the lower normalized spectrum, and the upper normalized spectrum may thus be points located on the surface of the unit hypersphere. The respective locations of these points on the surface of the unit hypersphere may represent the spectral reflectance spectrum of the moist sample, the spectral reflectance spectrum of the minimally moist sample, and the spectral reflectance spectrum of the maximally moist sample respectively.

The spectral reflectance spectra can be projected on the unit hypersphere by normalizing the spectra according to their length, i.e. by dividing each spectrum by the length of the spectrum. The length of a spectral reflectance spectrum may be obtained by determining the length of a vector that comprises the spectral reflectance values at the different wavelengths of the spectrum. This makes the computer-implemented method robust against scaling effects in the obtained hyperspectral measurements due to changes in acquisition conditions, e.g. illumination angle, acquisition angle, and distance from the hyperspectral measurement system.

According to an example embodiment, determining the water content of the moist sample according to the first predetermined relationship and/or the second predetermined relationship is further based on respective arc lengths between the normalized sample spectrum, the lower normalized spectrum, and the upper normalized spectrum on an arc of the unit hypersphere.

An arc of the unit hypersphere refers to a segment of a great circle connecting two points on the surface of the unit hypersphere, i.e. two outer points of the arc. The great circle is the largest circle that can be drawn on the surface of the unit hypersphere connecting the two points and dividing the unit hypersphere into two equal hemispheres. The two outer points of the arc may be any two of the normalized sample spectrum, the lower normalized spectrum, and the upper normalized spectrum. The other point or third point, i.e. the spectrum that does not define an outer point of the arc, may be referred to as the inner point. For example, the arc may be defined by the lower normalized spectrum and the upper normalized spectrum as outer points, while the normalized sample spectrum is the inner point. The inner point may be located on the arc between the two outer points, or elsewhere on the surface of the unit hypersphere. In the latter case, the inner point may be projected onto the arc between the two outer points.

The respective arc lengths thus refer to distances along the arc of the unit hypersphere between the outer points of the arc, and between the respective outer points and the inner point. In other words, the respective arc lengths refer to the respective distances along the arc of the unit hypersphere between the normalized sample spectrum, the lower normalized spectrum, and the upper normalized spectrum along an arc of the unit hypersphere defined by two of the spectra.

According to an example embodiment, the respective arc lengths comprise a first arc length between the lower normalized spectrum and the normalized sample spectrum, a second arc length between the normalized sample spectrum and the upper normalized spectrum, and a third arc length between the lower normalized spectrum and the upper normalized spectrum.

According to an example embodiment, determining the water content of the moist sample according to the first predetermined relationship may comprise:

determining a first relative arc length as the first arc length relative to the third arc length;

determining a second relative arc length as the second arc length relative to the third arc length; and determining the water content of the moist sample as a weighted sum of the minimum water content and the maximum water content respectively weighted by the first relative arc length and the second relative arc length.

The first predetermined relationship is applied when the water-layer thickness is larger than the minimum water-layer thickness and smaller than the maximum water-layer thickness. Thus, as water-layer thickness is indicative for the water content within a sample, the first predetermined relationship is applied if the water content in the moist sample is expected to be larger than the minimum water content and smaller than the maximum water content. The arc on the unit hypersphere may then be defined by the lower normalized spectrum and the upper normalized spectrum as the outer points. The normalized sample spectrum may then be located on the arc, or may be projected onto the arc, between the outer points as the inner point. This allows determining the water content of the moist sample based on the relative position of the normalized sample spectrum on the arc defined by the lower normalized spectrum and the upper normalized spectrum.

According to an example embodiment, determining the water content of the moist sample according to the second predetermined relationship may comprise, if the water-layer thickness is larger than the maximum water-layer thickness:

determining a first relative arc length as the third arc length relative to the first arc length;

determining a second relative arc length as the second arc length relative to the first arc length; and determining the water content of the moist sample as a ratio between the maximum water content decreased by the minimum water content multiplied with the second relative arc length, and the first relative arc length.

The second predetermined relationship may thus be applied when the water-layer thickness is larger than the maximum water-layer thickness. Thus, as water-layer thickness is indicative for the water content within a sample, the second predetermined relationship may be applied if the water content in the moist sample is expected to be larger than the maximum water content. The arc on the unit hypersphere may then be defined by the normalized sample spectrum and the lower normalized spectrum as the outer points. The upper normalized spectrum may then be located on the arc, or may be projected onto the arc, between the outer points as the inner point. This allows determining the water content of the moist sample based on the relative position of the upper normalized spectrum on the arc defined by the normalized sample spectrum and the lower normalized spectrum.

According to an example embodiment, determining the water content of the moist sample according to the second predetermined relationship comprises, if the water-layer thickness is smaller than the minimum water-layer thickness:

determining a first relative arc length as the first arc length relative to the second arc length;

determining a second relative arc length as the third arc length relative to the third arc length; and determining the water content of the moist sample as a ratio between the minimum water content decreased by the maximum water content multiplied with the first relative arc length, and the second relative arc length.

The second predetermined relationship may thus be applied when the water-layer thickness is smaller than the minimum water-layer thickness. Thus, as water-layer thickness is indicative for the water content within a sample, the second predetermined relationship may be applied if the water content in the moist sample is expected to be smaller than the minimum water content. The arc on the unit hypersphere may then be defined by the normalized sample spectrum and the upper normalized spectrum as the outer points. The lower normalized spectrum may then be located on the arc, or may be projected onto the arc, between the outer points as the inner point. This allows determining the water content of the moist sample based on the relative position of the lower normalized spectrum on the arc defined by the normalized sample spectrum and the upper normalized spectrum.

According to an example embodiment, determining the water-layer thickness within the moist sample, L, may comprise minimizing $$\left\| \frac{R_s}{\|R_s\|} - \frac{R_{dry} \odot SRF(\exp(-2aL))}{\|R_{dry} \odot SRF(\exp(-2aL))\|} \right\|;$$

wherein $R_s$ is the spectral reflectance spectrum of the moist sample, $R_{dry}$ is the spectral reflectance spectrum of the air-dried sample of the porous material, SRF is the spectral response function, and a is the absorption spectrum of water.

According to an example embodiment, the spectral reflectance spectrum of the moist sample comprises spectral reflectance values measured across a wavelength range of at least about 1100 nm to at most about 1700 nm, preferably at least about 1118 nm to at most about 1656 nm.

The spectral reflectance spectrum of the moist sample may thus comprise a substantial portion of the short-wave infrared spectrum, which includes the wavelength range from 1000 nm to 2500 nm. This allows determining the water content of the moist sample more accurately, as the wavelength range of at least about 1100 nm to at most about 1700 nm, preferably at least about 1118 nm to at most about 1656 nm, is more sensitive to changes in water content and less susceptive to noise. It is a further advantage that natural illumination can be used as illumination source in this wavelength range.

According to an example embodiment, the minimum water content and the maximum water content may be selected according to an intended use of the porous material.

Thus, the minimum water content and the maximum water content may define a range wherein the water content of the moist sample may be expected for a targeted application of the porous material. For example, the minimum water content may be about 5.0%, and the maximum water content may be about 15.0% for determining the water content of clay samples. Limiting the minimum water content and the maximum water content to an expected range of water content of the moist sample allows reducing the error in the determined water content.

According to an example embodiment, the computer-implemented method may further comprise:

obtaining respective hyperspectral measurements of the minimally moist sample and the maximally moist sample respectively comprising the spectral reflectance spectrum of the minimally moist sample and the maximally moist sample, and obtaining respective spectral response functions associated with the hyperspectral measurements;

determining the minimum water-layer thickness based on the spectral response function associated with the hyperspectral measurement of the minimally moist sample, the spectral reflectance spectrum of the minimally moist sample, the spectral reflectance spectrum of the air-dried sample, and the absorption spectrum of water; and determining the maximum water-layer thickness based on the spectral response function associated with the hyperspectral measurement of the maximally moist sample, the spectral reflectance spectrum of the maximally moist sample, the spectral reflectance spectrum of the air-dried sample, and the absorption spectrum of water.

These limited initialization steps may only have to be performed once. The initialization steps may be repeated when the water content of a different porous material is to be determined. Determining the minimum water-layer thickness and the maximum water-layer thickness based on the spectral response function associated with the hyperspectral measurements of respectively the minimally and maximally moist samples allows determining the water-layer thicknesses accurately regardless of the used hyperspectral measurement system.

According to a second aspect, a method for determining water content of a moist sample of porous material from a spectral reflectance spectrum of the moist sample is disclosed, the method comprising:

determining a minimum water content of a minimally moist sample of the porous material and a maximum water content of a maximally moist sample of the porous material;

obtaining respective hyperspectral measurements of the minimally moist sample, the maximally moist sample, and the moist sample by means of one or more hyperspectral measurement systems; and determining the water content of the moist sample according to the computer-implemented method according to the first aspect.

According to an example embodiment, the method may further comprise obtaining a hyperspectral measurement of an air-dried sample of the porous material.

According to an example embodiment, the minimum water content and the maximum water content may be determined by means of gravimetric analysis; and obtaining the respective hyperspectral measurements may include capturing one or more hyperspectral camera images.

According to a third example aspect, a data processing system is disclosed configured to perform the computer-implemented method according to the first aspect.

According to a fourth example aspect, a computer program product is disclosed comprising computer-executable instructions which, when the program is executed by a computer, cause the computer to perform the computer-implemented method according to the first aspect.

According to a fifth example aspect, a system is disclosed to determine water content of a moist sample of porous material from a spectral reflectance spectrum of the moist sample; the system comprising:

a hyperspectral measurement system configured to obtain a hyperspectral measurement of the moist sample, wherein the hyperspectral measurement system is characterised by a spectral response function; and a control unit configured to determine the water content of the moist sample from the hyperspectral measurement and the spectral response function according to the first aspect.

DETAILED DESCRIPTION OF EMBODIMENT(S)

Figure 1:
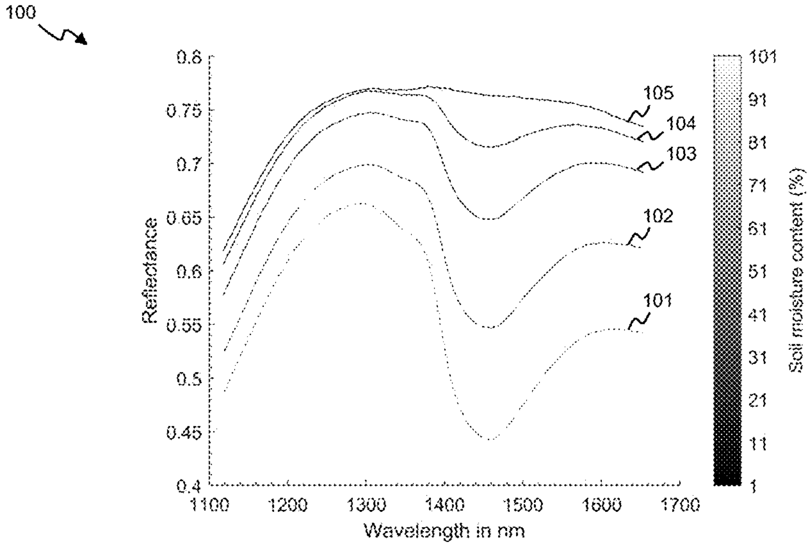
FIG. 1 shows an example of spectral reflectance spectra of the same porous material with different water contents.

FIG. 1 shows an example 100 of spectral reflectance spectra 101-105 of the same porous material having different water contents. The porous material associated with the spectral reflectance spectra 101-105 has a water content of 10%, 25%, 50%, 75%, and 100%, respectively. The water content may be expressed as the weight of water relative to the weight of the porous material. Thus, FIG. 1 illustrates that the spectral reflectance spectrum of a porous material is typically related to the water content present within the material.

Some non-destructive methods for determining the water content in a material are based on such a relationship between the spectral reflectance spectrum of the material and the water content within the material. These methods typically have a limited accuracy compared to destructive methods for determining the water content, e.g. gravimetric analysis. For example, gravimetric analysis typically allows determining the water content of a material sample with an error of about 0.1% to about 0.3%. Contrary, non-destructive methods based on the spectral reflectance of the sample may have a larger estimation error of around 3.0%. This accuracy can be insufficient for some industrial processes, e.g. monitoring the water content of clay bricks to control brick firing in a brickworks.

Some non-destructive testing methods aim to improve the estimation accuracy of the water content with machine learning. This has the problem that substantial training and calibrating is required to obtain a reliable and accurate machine learning model. This can be time-consuming as the water content of a substantial amount of training samples should be determined accurately to obtain a ground truth to train the model, typically by destructive testing methods. Additionally, the training and calibrating has to be repeated when determining the water content for a different material is desired.

Moreover, the acquisition conditions of the spectral reflectance spectrum and the measurement system used to obtain the spectral reflectance spectrum can substantially affect the obtained spectral reflectance spectrum. For example, the spectral reflectance spectrum of the same sample can vary substantially when obtained by different hyperspectral measurement systems due to different sensitivities to radiation at particular wavelengths and/or due to variations in the acquisition conditions. As such, gathering spectral reflectance spectra of training samples has to be repeated for each measurement system. This further makes it challenging to use a generic benchmark training set to train these machine learning models.

It can thus be desirable to provide a non-destructive method for determining the water content of a moist sample more accurately with limited training and calibrating.

Figure 2:
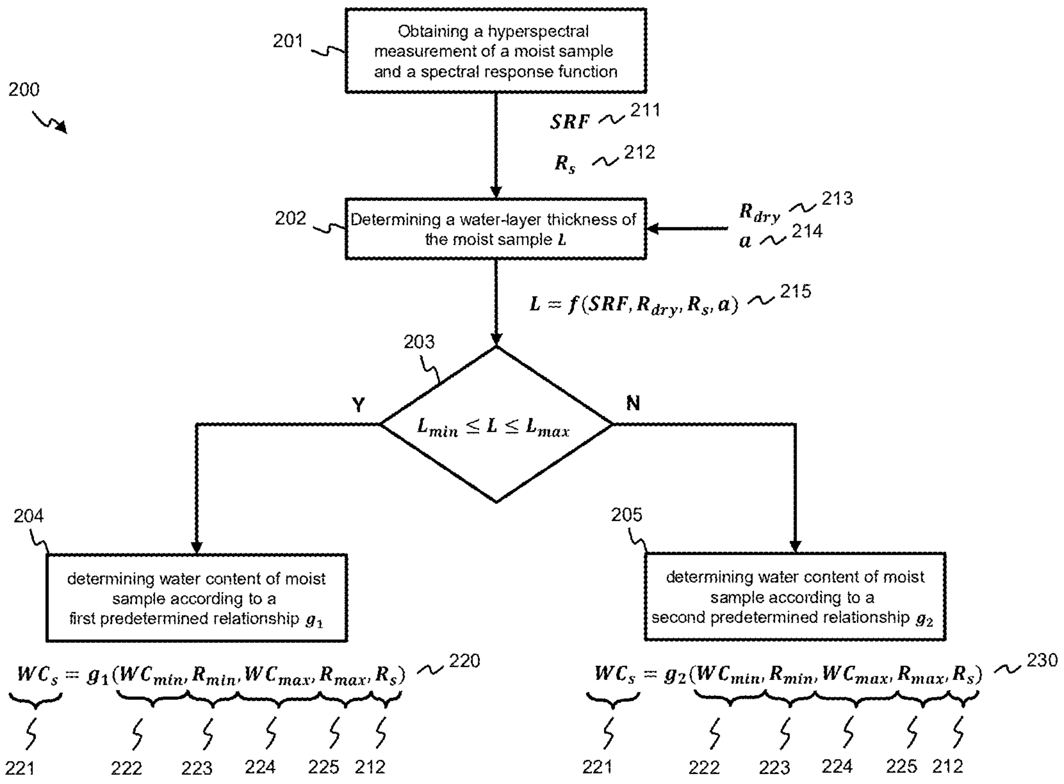
FIG. 2 shows steps of a computer-implemented method for determining water content of a moist sample of porous material from a spectral reflectance spectrum of a moist sample of porous material, according to an example embodiment.

FIG. 2 shows steps 200 of a computer-implemented method for determining water content of a moist sample of porous material from a spectral reflectance spectrum of the moist sample according to an example embodiment. The porous material may be a material comprising pores or void spaces within its structure that can be filled with an other substance, e.g. air, a fluid, or a gas. The porous material may further have a substantially linear relationship between the water content within the sample and a thickness of a water layer within the porous material. This relationship may at least be substantially linear for a water-layer thickness smaller than 200 μm. The water-layer thickness within a moist sample refers to the thickness of the layer of water adsorbed or held by the porous material within its pore structure, i.e. a thin layer surrounding the solid particles within the pores. The porous material may be a natural porous material such as, for example, soil, sandstone, limestone, or wood. The porous material may also be a man-made porous material such as, for example, a foam rubber, a foam plastic, aerated concrete, clay, a ceramic, or a synthetic sponge material.

In a first step 201, a hyperspectral measurement of a moist sample of the porous material is obtained. A moist sample of the porous material may refer to a sample having a degree of wetness or water content that is more than dry but not excessively wet or saturated. The hyperspectral measurement comprises the spectral reflectance spectrum of the moist sample $R_s$ 212. The computer-implemented method may, thus, further comprise obtaining the spectral reflectance spectrum of the moist sample $R_s$ 212 from the hyperspectral measurement of the moist sample. The hyperspectral measurement of the moist sample can be provided by a hyperspectral measurement system configured to obtain hyperspectral measurements of a sample at various wavelengths, e.g. a spectrometer, a spectroradiometer, or a hyperspectral camera. Such a hyperspectral measurement system is characterised by a spectral response function 211, SRF, that defines the sensitivity of the measurement system to radiation at particular wavelengths. Step 201 further comprises obtaining the spectral response function 211 associated with the hyperspectral measurement of the moist sample. In other words, the spectral response function 211 of the hyperspectral measurement system used to obtain the hyperspectral measurement of the moist sample is obtained in step 201. The signal response function can allow accounting for noise in the hyperspectral measurement. For example, in an area of low spectral response to a wavelength of interest there may be a substantially higher signal-to-noise ratio, which can be accounted for when analysing the data.

The spectral reflectance spectrum of the moist sample $R_s$ 212 may comprise spectral reflectance values measured across a wavelength range of at least about 1100 nm to at most about 1700 nm. In other words, the spectral reflectance spectrum of the moist sample $R_s$ may thus comprise a substantial portion of the short-wave infrared spectrum. Preferably, the spectral reflectance spectrum of the moist sample $R_s$ may comprise spectral reflectance values measured across a wavelength range of at least about 1118 nm to at most about 1656 nm. This allows determining the water content of the moist sample more accurately, as these wavelengths ranges are more sensitive to changes in water content and are less susceptive to noise. It is an advantage that natural illumination can be used as illumination source in the wavelength range of the short-wave infrared spectrum.

In a following step 202, the water-layer thickness L 215 within the moist sample is determined as a function of the obtained inputs, i.e. the spectral response function 211 and the spectral reflectance spectrum of the moist sample $R_s$ 212, and initialization data, i.e. a spectral reflectance spectrum of an air-dried sample of the porous material $R_{dry}$ 213 and the absorption spectrum of water a 214.

An air-dried sample of the porous material may be a sample that is dried without the application of external heat, e.g. by allowing the sample to dry at room temperature through natural circulation of air. In other words, the air-dried sample may be a sample that is dried under atmospheric conditions. The air-dried sample may thus still comprise a limited amount of water, e.g. 1% or 2% gravimetric water content. This is sometimes referred to as structural water content. The spectral reflectance spectrum of the air-dried sample $R_{dry}$ 213 may be obtained during an initialization measurement with the same hyperspectral measurement system used to obtain the hyperspectral measurement of the moist sample, e.g. by means of a spectrometer, a spectroradiometer, or a hyperspectral camera. It will be apparent that the spectral reflectance spectrum of the air-dried sample $R_{dry}$ 213 is only obtained once to initialize the computer-implemented method 200, e.g. during an initialization step. The absorption spectrum of water 214 defines the wavelengths of electromagnetic radiation that water can absorb and, thus, provides information about how water interacts with light at different wavelengths. It will be apparent that the absorption spectrum of water 214 is a material property of water, and thus, does not require any initialization measurement to obtain, as this material property is known.

Determining the water-layer thickness 215 in step 202 may be achieved by minimizing $$\left\| \frac{R_s}{\|R_s\|} - \frac{R_{dry} \odot SRF(\exp(-2aL))}{\|R_{dry} \odot SRF(\exp(-2aL))\|} \right\| \quad \text{(Eq. 1)}$$

wherein L is the water-layer thickness 215 of the moist sample, $R_s$ is the spectral reflectance spectrum of the moist sample 212, $R_{dry}$ is the spectral reflectance spectrum of the air-dried sample 213 of the porous material, SRF is the spectral response function 211, and a is the absorption spectrum of water 214.

Determining 202 the water-layer thickness 215 within the moist sample based on the signal response function 211 associated with the hyperspectral measurement of the moist sample allows determining the water-layer thickness 215 accurately regardless of the used hyperspectral measurement system. In other words, the spectral response function 211 allows accounting for the variation in the spectral reflectance spectrum 212 due to the used hyperspectral measurement system's sensitivities to radiation at particular wavelengths. In doing so, the water-layer thickness 215 can be determined with a similar accuracy based on hyperspectral measurements obtained by any hyperspectral measurement system.

The water-layer thickness 215 is indicative for the water content within the moist sample. As such, in a next step 203, the water-layer thickness of the moist sample L is compared to a minimum water-layer thickness $L_{min}$ and a maximum water-layer thickness $L_{max}$. The minimum water-layer thickness $L_{min}$ is the thickness of the layer of water within a minimally moist sample of the porous material with a minimum water content. The minimally moist sample may, for example, have a gravimetric water content between 1% and 10%. The maximum water-layer thickness $L_{max}$ is the thickness of the layer of water within a maximally moist sample of the porous material with a maximum water content. The maximally moist sample may, for example, have a gravimetric water content between 10% and 20%. It will be apparent that the minimally moist sample and maximally moist sample may have other gravimetric water contents between substantially dry and substantially saturated, as long as the maximum water content is larger than the minimum water content.

The minimum water content and the maximum water content may further be selected according to the intended use of the porous material. Thus, the minimum water content and the maximum water content may define a range wherein the water content of the moist sample may be expected for a targeted application of the porous material. For example, the minimum water content may be about 5.0%, and the maximum water content may be about 15.0% for determining the water content of clay samples. Limiting the minimum water content and the maximum water content to an expected range of water content of the moist sample allows reducing the error in the determined water content. It is an advantage that a limited range between the minimum water content and the maximum water content reduces the error in the determined water content of the moist sample.

The water content in the moist sample is then determined according to a first predetermined relationship $g_1$ 220 in step 204, or a second predetermined relationship $g_2$ 230 in step 205. The first predetermined relationship 220 allows determining the water content of the moist sample 221 if the water content of the moist sample falls within the range defined by the minimum water content and the maximum water content. The second predetermined relationship 230 allows determining the water content of the moist sample 221 if the water content of the moist sample falls outside of the range defined by the minimum water content and the maximum water content.

As the water-layer thickness 215 is indicative for the water content within the moist sample, comparing the determined water-layer thickness of the moist sample 215 with the minimum water-layer thickness and the maximum water-layer thickness in step 203 allows selecting the first predetermined relationship $g_1$ 220 or the second predetermined relationship $g_2$ 230 to determine the water content of the moist sample 221. Thus, the first predetermined relationship 220 is selected if the water-layer thickness 215 of the moist sample is at least equal to the minimum water-layer thickness and at most equal to the maximum water-layer thickness, i.e. $L_{min} \leq L \leq L_{max}$. Alternatively, the second predetermined relationship 230 is selected if the water-layer thickness 215 of the moist sample is smaller than the minimum water-layer thickness or the water-layer thickness 215 of the moist sample is larger than the maximum water-layer thickness, i.e. $L < L_{min}$ or $L_{max} < L$.

The first 220 and second 230 predetermined relationships may respectively be an interpolation and an extrapolation of the water content of the moist sample based on the spectral reflectance spectrum of the moist sample $R_s$ 212, the spectral reflectance spectrum of the minimally moist sample $R_{min}$ 223, the spectral reflectance spectrum of the maximally moist sample $R_{max}$ 225, the minimum water content $WC_{min}$ 222, and the maximum water content $WC_{max}$ 224.

The spectral reflectance spectrum of the minimally moist sample $R_{min}$ 223, the spectral reflectance spectrum of the maximally moist sample $R_{max}$ 225, the minimum water content $WC_{min}$ 222, and the maximum water content $WC_{max}$ 224 can be obtained by initialization measurements, e.g. during an initialization step of the computer-implemented method 200. The spectral reflectance spectrum of the minimally moist sample $R_{min}$ 223 and the spectral reflectance spectrum of the maximally moist sample $R_{max}$ 225 can for example be obtained by a hyperspectral measurement of the minimally moist sample and the maximally moist sample. This may be performed with the same hyperspectral measurement system used to obtain the hyperspectral measurement of the moist sample. The minimum water content $WC_{min}$ 222 and the maximum water content $WC_{max}$ 224 can for example be obtained by gravimetric analysis of the minimally moist sample and the maximally moist sample. It is an advantage that this initialization data can be obtained by a limited amount of initialization measurements on a limited amount of samples.

This allows determining the water content 221 of the moist sample without substantial calibrating or initializing, and without training a machine learning model. This has the advantage that the computer-implemented method is time-efficient, as testing a substantial amount of samples of the porous material can be avoided. It is a further advantage that the costs associated with determining the water content in moist samples of porous material can be reduced, as determining the water content according to the computer-implemented method is non-destructive, non-invasive, and only a limited amount of samples are needed for initialization, i.e. an air-dried sample, a minimally moist sample, and a maximally moist sample. It is a further advantage that the computer-implemented method can be used for continuous monitoring of porous material samples, e.g. for monitoring the water content of clay bricks moving on a conveyor belt within a brickworks.

Determining the water content of the moist sample 221 according to the first 220 or second 230 predetermined relationship in steps 204, 205 may further comprise projecting the spectral reflectance spectrum of the moist sample $R_s$ 212, the spectral reflectance spectrum of the minimally moist sample $R_{min}$ 223, and the spectral reflectance spectrum of the maximally moist sample $R_{max}$ 225 on a unit hypersphere.

A unit hypersphere refers to a mathematical concept representing a sphere in n-dimensional space, where each point on the sphere is at a fixed distance of one unit from the origin. The spectral reflectance spectra 212, 223, 225 can be projected on the unit hypersphere by normalizing the spectra according to their length, i.e. by dividing each spectrum by the length of the spectrum. The length of a spectral reflectance spectrum may be obtained by determining the length of a vector that comprises the spectral reflectance values at the different wavelengths of the spectrum.

In doing so, the spectral reflectance spectra 212, 223, 225 are represented by respective points located on the surface of the unit hypersphere. These respective points are referred to as the normalized sample spectrum, the lower normalized spectrum, and the upper normalized spectrum. The respective locations of these points on the surface of the unit hypersphere may thus represent the spectral reflectance spectrum of the moist sample $R_s$ 212, the spectral reflectance spectrum of the minimally moist sample $R_{min}$ 223, and the spectral reflectance spectrum of the maximally moist sample $R_{max}$ 225 respectively.

This projecting results in normalizing the reflectance spectra to have unit length, thereby making the computer-implemented method robust against scaling effects in the hyperspectral measurements due to changes in acquisition conditions, e.g. illumination angle, acquisition angle, and distance from the hyperspectral measurement system.

The water content of the moist sample 221 may then be determined based on respective arc lengths between the normalized sample spectrum, the lower normalized spectrum, and the upper normalized spectrum on an arc of the unit hypersphere.

An arc of the unit hypersphere refers to a segment of a great circle connecting two points on the surface of the unit hypersphere, i.e. two outer points of the arc. The great circle is the largest circle that can be drawn on the surface of the unit hypersphere connecting the two points and dividing the unit hypersphere into two equal hemispheres. The two outer points of the arc may be any two of the normalized sample spectrum, the lower normalized spectrum, and the upper normalized spectrum. The other point or third point, i.e. the spectrum that does not define an outer point of the arc, may be referred to as the inner point. For example, the arc may be defined by the lower normalized spectrum and the upper normalized spectrum as outer points, while the normalized sample spectrum is the inner point.

The inner point may be located on the arc between the two outer points, or elsewhere on the surface of the unit hypersphere. In the latter case, the inner point may be projected onto the arc between the two outer points. The respective arc lengths thus refer to the distances along the arc of the unit hypersphere between the respective outer points of the arc and the inner point, whether projected onto the arc or not. In other words, the respective arc lengths refer to distances along the arc of the unit hypersphere between the normalized sample spectrum, the lower normalized spectrum, and the upper normalized spectrum along an arc of the unit hypersphere defined by two of the spectra.

Figure 3:
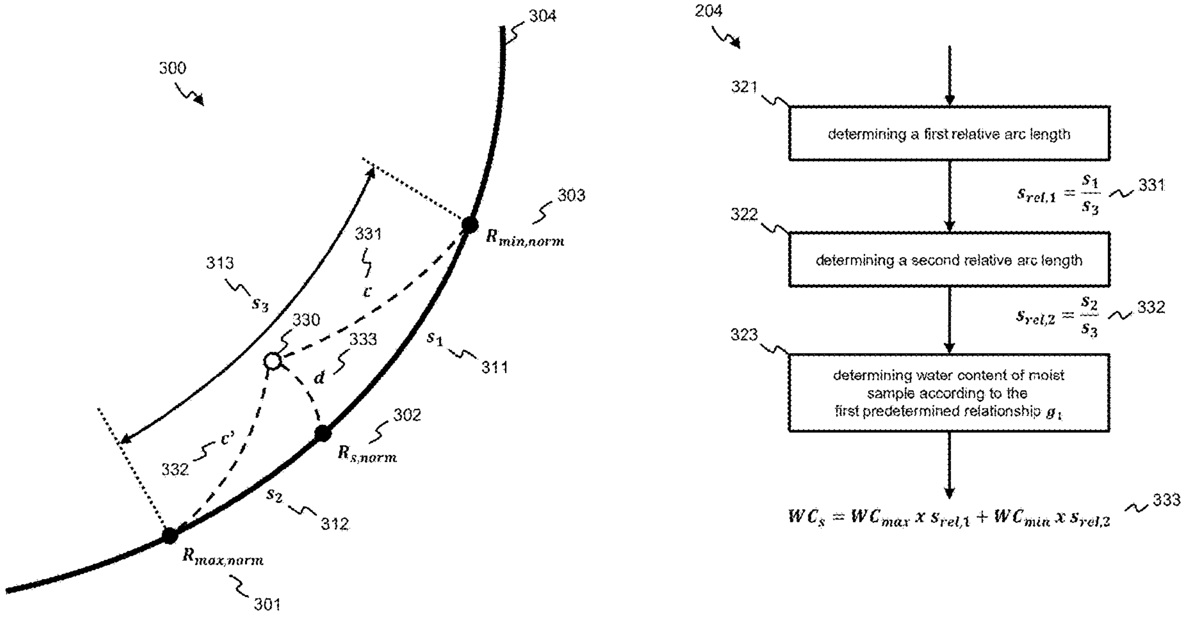
FIG. 3 shows steps for determining the water content of the moist sample according to a first predetermined relationship, according to an example embodiment.

FIG. 3 shows an example embodiment 300 of respective arc lengths 311, 312, 313 between the normalized sample spectrum 302, the lower normalized spectrum 303, and the upper normalized spectrum 301 on an arc 304 of the unit hypersphere. The respective arc lengths may comprise a first arc length $s_1$ 311 between the lower normalized spectrum 303 and the normalized sample spectrum 302, a second arc length $s_2$ 312 between the normalized sample spectrum 302 and the upper normalized spectrum 301, and a third arc length $s_3$ 313 between the lower normalized spectrum 303 and the upper normalized spectrum 301.

FIG. 3 further shows steps 204 according to an example embodiment for determining the water content 333 of the moist sample according to the first predetermined relationship, i.e. if the water-layer thickness of the moist sample is at least equal to the minimum water-layer thickness and at most equal to the maximum water-layer thickness. In other words, steps 321-323 may be included in step 204 of FIG. 2.

In a first step 321, a first relative arc length $s_{rel,1}$ 331 is determined as the first arc length $s_1$ 311 relative to the third arc length $s_3$ 313, i.e.

$$s_{rel,1} = \frac{s_1}{s_3}.$$

In a following step 322, a second relative arc length $s_{rel,2}$ 332 is determined as the second arc length $s_2$ 312 relative to the third arc length $s_3$ 313, i.e.

$$s_{rel,2} = \frac{s_2}{s_3}.$$

In a next step 323, the water content of the moist sample 333 can then be determined according to the first predetermined relationship as $$WC_s = WC_{max} \times s_{rel,1} + WC_{min} \times s_{rel,2} \quad \text{(Eq. 2)}$$

As discussed above in relation to FIG. 2, the normalized sample spectrum 302, the lower normalized spectrum 303, or the upper normalized spectrum 301 may not be located on the arc 304. FIG. 3 further shows an example of a normalized sample spectrum 330 that is located elsewhere on the surface of the unit hypersphere, i.e. not on arc 304. As such, the normalized sample spectrum may be projected on the arc 304 by the following set of equations:

$$\cos(s_1) = \frac{\sin(s_1 + s_2)}{\sqrt{\left[\left[\frac{\cos(c')}{\cos(c)}\cos(s_1 + s_2)\right]^2 + \sin^2(s_1 + s_2)\right]}} \quad \text{(Eq. 3)}$$

$$s_1 + s_2 = \arccos\left(R_{min,norm}^T R_{max,norm}\right) \quad \text{(Eq. 4)}$$

wherein c is the arc length 331 of an arc on the surface of the unit hypersphere that connects the normalized sample spectrum 330 and the lower normalized spectrum 303; and c' is the arc length 332 of an arc on the surface of the unit hypersphere that connects the normalized sample spectrum 330 and the upper normalized spectrum 301. This allows determining the first arc length $s_1$ 311 and the second arc length $s_2$ when the inner point, i.e. normalized sample spectrum 330 in this example, is not located on the arc 304 connecting the two outer points, i.e. $R_{min,norm}$ 303 and $R_{max,norm}$ 301 in this example. Hereafter, the water content of the moist sample 333 may be determined by performing steps 321, 322, and 323 as described above.

Figure 4:
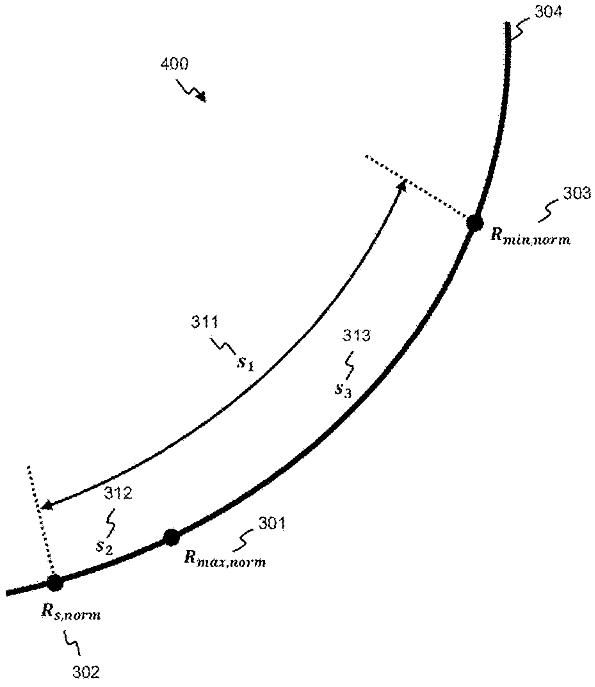
FIG. 4 shows steps for determining the water content of the moist sample according to a second predetermined relationship if the water-layer thickness of the moist sample is larger than the maximum water-layer thickness, according to an example embodiment.
Figure 4:
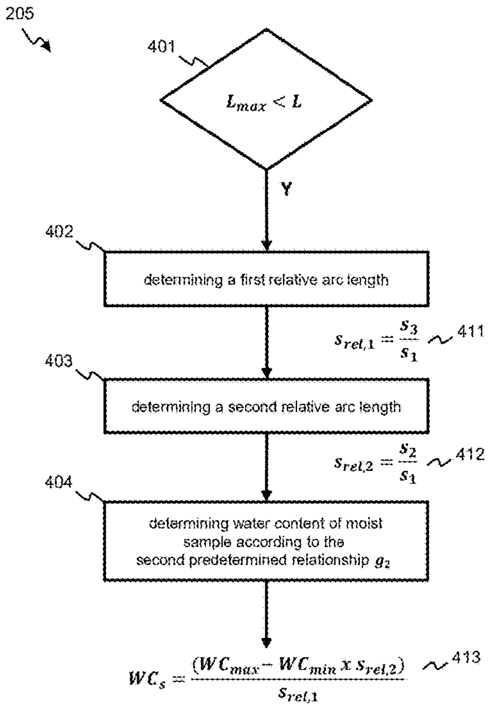

FIG. 4 shows steps 205 according to an example embodiment for determining the water content 413 of the moist sample according to the second predetermined relationship if 401 the water-layer thickness 215 of the moist sample is larger than the maximum water-layer thickness, i.e. if $L_{max}$<L. In other words, steps 401-404 may be included in step 205 of FIG. 2 FIG. 4 further shows an example 400 of the respective arc lengths 311, 312, 313 between the normalized sample spectrum 302, the lower normalized spectrum 303, and the upper normalized spectrum 301 on an arc 304 of the unit hypersphere. In this case, the upper normalized spectrum 301 is located on the arc 304 connecting the normalized sample spectrum 302 and the lower normalized spectrum 303, i.e. the upper normalized spectrum 301 is the inner point on the arc 304.

In a first step 402, a first relative arc length $s_{rel,1}$ 411 is determined as the third arc length $s_3$ 313 relative to the first arc length $s_1$ 311, i.e.

$$s_{rel,1} = \frac{s_3}{s_1}.$$

In a following step 403, a second relative arc length $s_{rel,2}$ 412 is determined as the second arc length $s_2$ 312 relative to the first arc length $s_1$ 311, i.e.

$$s_{rel,2} = \frac{s_2}{s_1}.$$

In a next step 404, the water content of the moist sample 413 can then be determined according to the second predetermined relationship as $$WC_s = \frac{(WC_{max} - WC_{min} \times s_{rel,2})}{s_{rel,1}} \quad \text{(Eq. 5)}$$

It will be apparent that the inner point, i.e. the upper normalized spectrum 301, may not be located on the arc 304 connecting the lower normalized spectrum 303 and the normalized sample spectrum 301 (not shown in FIG. 4). If the upper normalized spectrum is not located on arc 304, it may be projected onto the arc by applying Eq. 3 and Eq. 4 to the upper normalized spectrum instead of the normalized sample spectrum as described in relation to FIG. 3.

Figure 5:
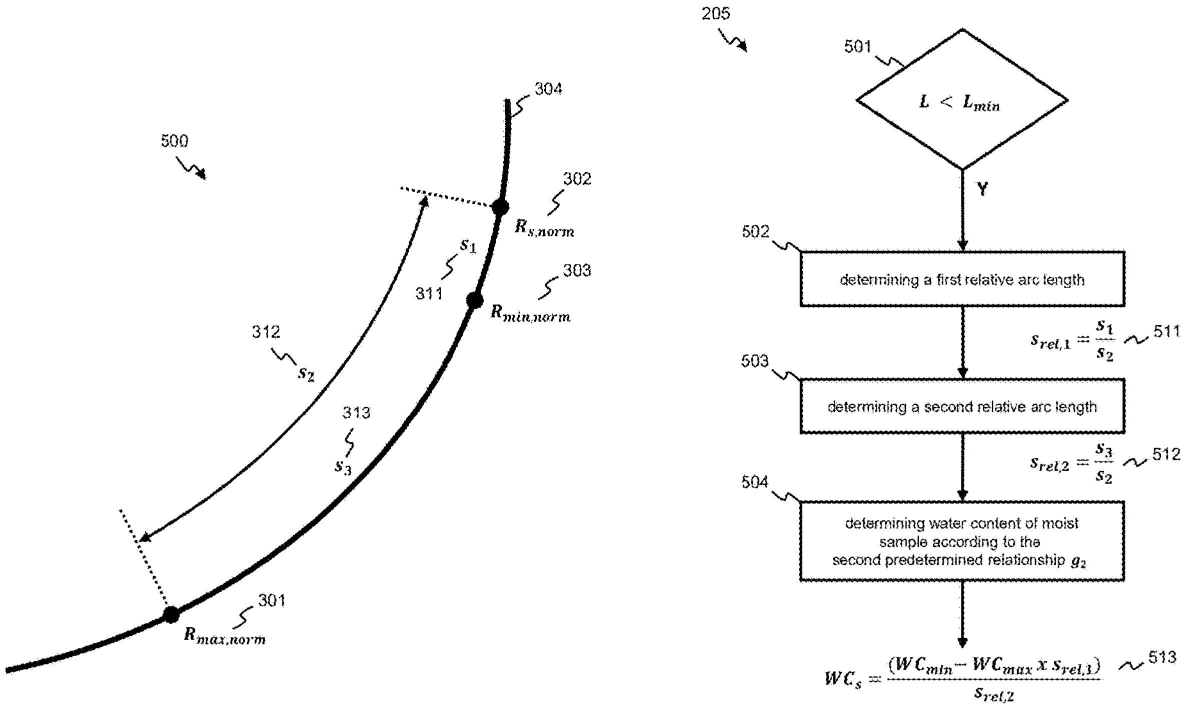
FIG. 5 shows steps for determining the water content of the moist sample according to a second predetermined relationship if the water-layer thickness of the moist sample is smaller than the minimum water-layer thickness, according to an example embodiment.

FIG. 5 shows steps 205 according to an example embodiment for determining the water content 513 of the moist sample according to the second predetermined relationship if 501 the water-layer thickness 215 of the moist sample is smaller than the minimum water-layer thickness, i.e. if $L<L_{min}$. In other words, steps 501-504 may be included in step 205 of FIG. 2. FIG. 5 further shows an example 500 of the respective arc lengths 311, 312, 313 between the normalized sample spectrum 302, the lower normalized spectrum 303, and the upper normalized spectrum 301 on an arc 304 of the unit hypersphere. In this case, the lower normalized spectrum 303 is located on the arc 304 connecting the normalized sample spectrum 302 and the upper normalized spectrum 301, i.e. the lower normalized spectrum 301 is the inner point on the arc 304.

In a first step 502, a first relative arc length $s_{rel,1}$ 511 is determined as the first arc length $s_1$ 311 relative to the second arc length $s_2$ 312, i.e.

$$s_{rel,1} = \frac{s_1}{s_2}.$$

In a following step 503, a second relative arc length $s_{rel,2}$ 512 is determined as the third arc length $s_3$ 313 relative to the second arc length $s_2$ 312, i.e.

$$s_{rel,2} = \frac{s_2}{s_1}.$$

In a next step 504, the water content of the moist sample 513 can then be determined according to the second predetermined relationship as $$WC_s = \frac{(WC_{min} - WC_{max} \times s_{rel,1})}{s_{rel,2}} \quad \text{(Eq. 6)}$$

It will be apparent that the inner point, i.e. the lower normalized spectrum 303, may not be located on the arc 304 connecting the upper normalized spectrum 301 and the normalized sample spectrum 302 (not shown in FIG. 5). If the lower normalized spectrum is not located on arc 304, it may be projected onto the arc by applying Eq. 3 and Eq. 4 to the lower normalized spectrum instead of the normalized sample spectrum as described in relation to FIG. 3.

Figure 6:
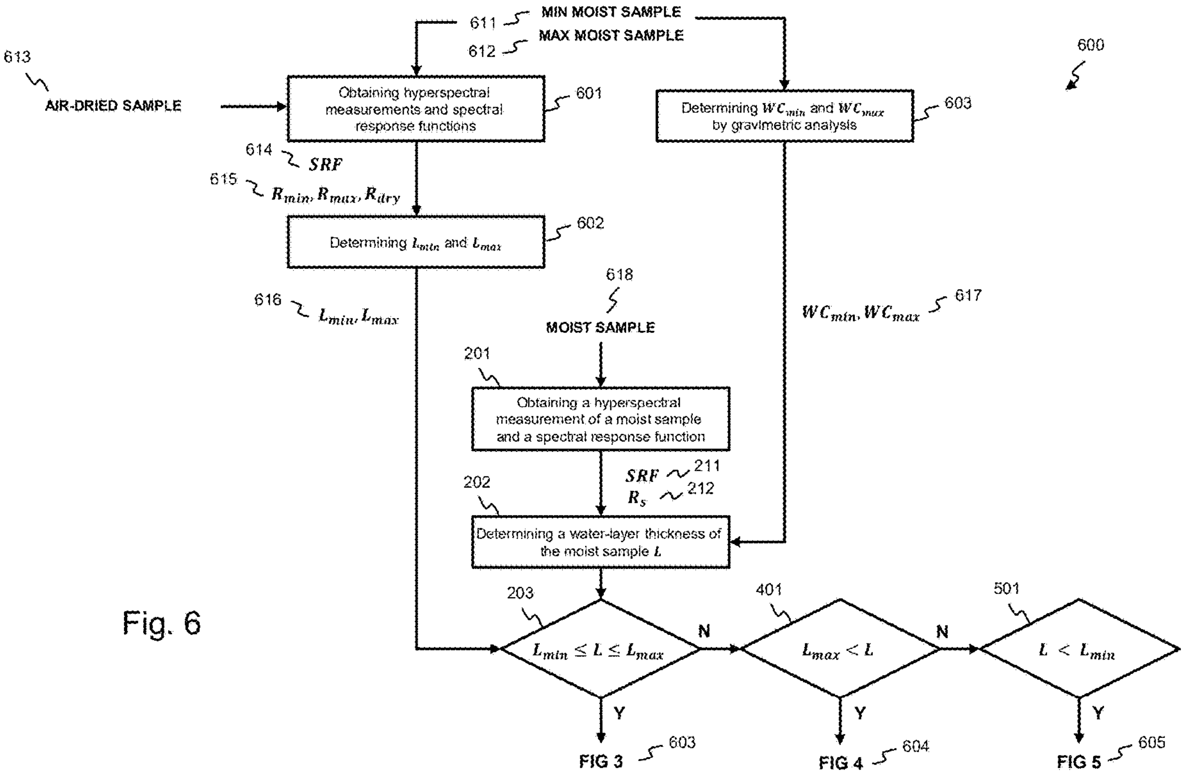
FIG. 6 shows steps of a method for determining water content in a moist sample of porous material, according to example embodiments.

FIG. 6 shows steps 600 of a method for determining water content in a moist sample 614 of porous material. The method may comprise one or more initialization steps 601, 602, 603 which are performed prior to determining water content in a moist sample 614 of porous material. During a first initialization step 601, hyperspectral measurements may be obtained of a minimally moist sample of the porous material 611, a maximally moist sample of the porous material 612, and an air-dried sample of the porous material 613. These hyperspectral measurements may be obtained by the same hyperspectral measurement system. The hyperspectral measurements may, for example, be respective hyperspectral camera images captured by means of a hyperspectral camera. The respective hyperspectral measurements comprise the spectral reflectance spectrum of the minimally moist sample $R_{min}$, the maximally moist sample $R_{max}$, and the air-dried sample $R_{dry}$, respectively. These spectral reflectance spectra 615 may thus be obtained from the respective hyperspectral measurements. The minimally moist sample 611, the maximally moist sample 612, and/or the air-dried sample 613 may further be grinded to a fine-grained or powdery sample before obtaining the hyperspectral measurements. This can increase the accuracy of the spectral reflectance spectra as the grinding improves the homogeneity of the samples.

The first initialization step 601 may further comprise obtaining spectral response functions 614 of the hyperspectral measurement systems used to obtain the hyperspectral measurements of the samples 611, 612, 613. It will be apparent that the respective spectral response functions 614 are the same when the same hyperspectral measurement system is used to obtain the hyperspectral measurements of samples 611, 612, and 613.

In a following initialization step 602, the minimum water-layer thickness $L_{min}$ and the maximum water-layer thickness Lynx may be determined. The minimum-water layer thickness $L_{min}$ and the maximum-water layer thickness $L_{max}$ may be determined based on the spectral response function SRF 614 associated with the hyperspectral measurement system used to obtain the hyperspectral measurement of the minimally moist sample 611 and the maximally moist sample 612. This can, for example, be achieved by minimizing Eq. 7 and Eq. 8 for the minimum water-layer thickness and the maximum water-layer thickness respectively.

$$\left\| \frac{R_{min}}{\|R_{min}\|} - \frac{R_{dry} \odot SRF(\exp(-2aL_{min}))}{\|R_{dry} \odot SRF(\exp(-2aL_{min}))\|} \right\| \quad \text{(Eq. 7)}$$

$$\left\| \frac{R_{max}}{\|R_{max}\|} - \frac{R_{dry} \odot SRF(\exp(-2aL_{max}))}{\|R_{dry} \odot SRF(\exp(-2aL_{max}))\|} \right\| \quad \text{(Eq. 8)}$$

This allows to determine the minimum water-layer thickness Linin and the maximum water-layer thickness $L_{max}$ accurately regardless of the used hyperspectral measurement system, as SRF 614 allows accounting for the variation in the spectral reflectance spectrum due to the used measurement system's sensitivities to radiation at particular wavelengths. Alternatively, the minimum water-layer thickness $L_{min}$ and/or the maximum water-layer thickness $L_{max}$ may be determined without accounting for the SRF 614, e.g. by minimizing $$\|R_{min} - R_{dry} \odot \exp(-2aL_{min})\| \quad \text{(Eq. 9)}$$

$$\|R_{max} - R_{dry} \odot \exp(-2aL_{minmax})\| \quad \text{(Eq. 10)}$$

In another initialization step 603, the minimum water content $WC_{min}$ within the minimally moist sample 611 and the maximum water content $WC_{max}$ within the maximally moist sample 612 may be determined. This can be achieved by means of gravimetric analysis. The minimally moist sample 611 and/or the maximally moist sample 612 may further be grinded to a fine-grained or powdery sample before performing the gravimetric analysis. This can increase the accuracy of the ground truth minimum water content and maximum water content as the grinding improves the homogeneity of the samples.

FIG. 6 further shows steps 201, 202, 203, 401, 501, 603, 604, 605 of a computer-implemented method for determining the water content of a moist sample 618 based on the initialization data 616, 617. The initialization data obtained during the initialization steps 601, 602, 603 can be sufficient to determine the water content of a moist sample 618 of porous material. It is thus an advantage that this initialization data can be obtained by a limited amount of initialization measurements on a limited amount of samples 611, 612, 613.

Initialization steps 601 and 602 may be performed in parallel with initialization step 603, i.e. substantially at the same time. This allows initializing the computer-implemented method faster. Alternatively, initialization steps 601 and 602 may be performed before initialization step 603, i.e. sequentially. This allows using the same minimally moist sample 611 and/or maximally moist sample 612 in step 601 and 603, e.g. by obtaining a hyperspectral measurement of a sample and thereafter performing a destructive test to determine the water content on the same sample.

Steps 201-203 may be substantially similar as discussed in relation to FIG. 2. If in step 203 the water-layer thickness of the moist sample 618 is at least equal to the minimum water-layer thickness and at most equal to the maximum water-layer thickness, i.e. if $L_{min} \leq L \leq L_{max}$, steps 321, 322, 323 may be performed as discussed in relation to FIG. 3 to determine the water content of the moist sample according to Eq. 2. Else, if in step 401 the water-layer thickness of the moist sample 618 is larger than the maximum water-layer thickness, i.e. if $L_{max} < L$, steps 402, 403, 404 may be performed as discussed in relation to FIG. 4 to determine the water content of the moist sample 618 according to Eq. 5. Else, if in step 501 the water-layer thickness of the moist sample 618 is smaller than the minimum water-layer thickness, i.e. if $L < L_{min}$, steps 502, 503, 504 may be performed as discussed in relation to FIG. 5 to determine the water content of the moist sample 618 according to Eq. 6.

Figure 7:
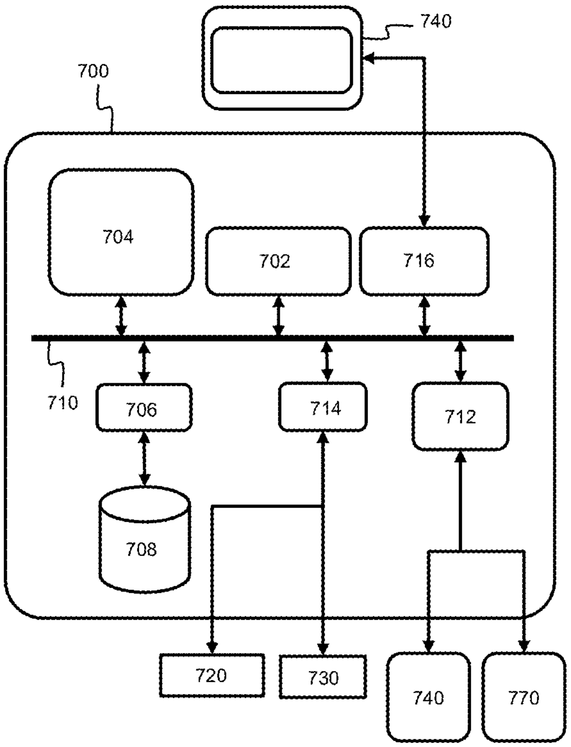
FIG. 7 shows a suitable computing system for performing steps according to example aspects of the disclosure.

FIG. 7 shows a suitable computing system 700 enabling to implement embodiments of the above described computer-implemented method. Computing system 700 may in general be formed as a suitable general-purpose computer and comprise a bus 710, a processor 702, a local memory 704, one or more optional input interfaces 714, one or more optional output interfaces 716, a communication interface 712, a storage element interface 706, and one or more storage elements 708. Bus 710 may comprise one or more conductors that permit communication among the components of the computing system 700. Processor 702 may include any type of conventional processor or microprocessor that interprets and executes programming instructions. Local memory 704 may include a random-access memory (RAM) or another type of dynamic storage device that stores information and instructions for execution by processor 702 and/or a read only memory (ROM) or another type of static storage device that stores static information and instructions for use by processor 702. Input interface 714 may comprise one or more conventional mechanisms that permit an operator or user to input information to the computing device 700, such as a keyboard 720, a mouse 730, a pen, voice recognition and/or biometric mechanisms, a camera, etc. Output interface 716 may comprise one or more conventional mechanisms that output information to the operator or user, such as a display 740, etc. Communication interface 712 may comprise any transceiver-like mechanism such as for example one or more Ethernet interfaces that enables computing system 700 to communicate with other devices and/or systems such as for example, amongst others, a hyperspectral measurement system 770. The communication interface 712 of computing system 700 may be connected to such another computing system by means of a local area network (LAN) or a wide area network (WAN) such as for example the internet. Storage element interface 706 may comprise a storage interface such as for example a Serial Advanced Technology Attachment (SATA) interface or a Small Computer System Interface (SCSI) for connecting bus 710 to one or more storage elements 708, such as one or more local disks, for example SATA disk drives, and control the reading and writing of data to and/or from these storage elements 708. Although the storage element(s) 708 above is/are described as a local disk, in general any other suitable computer-readable media such as a removable magnetic disk, optical storage media such as a CD or DVD, -ROM disk, solid state drives, flash memory cards, etc. could be used.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A computer-implemented method for determining water content of a moist sample of porous material from a spectral reflectance spectrum of the moist sample; the computer-implemented method comprising:

obtaining a hyperspectral measurement of the moist sample comprising the spectral reflectance spectrum, and a spectral response function associated with the hyperspectral measurement;

determining a water-layer thickness within the moist sample based on the spectral response function, the spectral reflectance spectrum of the moist sample, a spectral reflectance spectrum of an air-dried sample of the porous material, and an absorption spectrum of water;

if the water-layer thickness within the moist sample is at least equal to a minimum water-layer thickness of a minimally moist sample of the porous material with a minimum water content, and at most equal to a maximum water-layer thickness of a maximally moist sample of the porous material with a maximum water content: determining the water content of the moist sample based on the spectral reflectance spectrum of the moist sample, the minimum water content, the maximum water content, a spectral reflectance spectrum of the minimally moist sample, and a spectral reflectance spectrum of the maximally moist sample according to a first predetermined relationship; and if the water-layer thickness is larger than the maximum water-layer thickness, or smaller than the minimum water-layer thickness: determining the water content of the moist sample based on the spectral reflectance spectrum of the moist sample, the minimum water content, the maximum water content, the spectral reflectance spectrum of the minimally moist sample, and the spectral reflectance spectrum of the maximally moist sample according to a second predetermined relationship.

2. The computer-implemented method according to claim 1, further comprising determining a normalized sample spectrum, a lower normalized spectrum, and an upper normalized spectrum by respectively projecting the spectral reflectance spectrum of the moist sample, the spectral reflectance spectrum of the minimally moist sample, and the spectral reflectance spectrum of the maximally moist sample on a unit hypersphere.

3. The computer-implemented method according to claim 2, wherein determining the water content of the moist sample according to the first predetermined relationship and/or the second predetermined relationship is further based on respective arc lengths between the normalized sample spectrum, the lower normalized spectrum, and the upper normalized spectrum on an arc of the unit hypersphere.

4. The computer-implemented method according to claim 3, wherein the respective arc lengths comprise a first arc length between the lower normalized spectrum and the normalized sample spectrum, a second arc length between the normalized sample spectrum and the upper normalized spectrum, and a third arc length between the lower normalized spectrum and the upper normalized spectrum.

5. The computer-implemented method according to claim 4, wherein determining the water content of the moist sample according to the first predetermined relationship comprises:

determining a first relative arc length as the first arc length relative to the third arc length;

determining a second relative arc length as the second arc length relative to the third arc length; and determining the water content of the moist sample as a weighted sum of the maximum water content and the minimum water content respectively weighted by the first relative arc length and the second relative arc length.

6. The computer-implemented method according to claim 4, wherein determining the water content of the moist sample according to the second predetermined relationship comprises, if the water-layer thickness is larger than the maximum water-layer thickness:

determining a first relative arc length as the third arc length relative to the first arc length;

determining a second relative arc length as the second arc length relative to the first arc length; and determining the water content of the moist sample as a ratio between the maximum water content decreased by the minimum water content multiplied with the second relative arc length, and the first relative arc length.

7. The computer-implemented method according to claim 4, wherein determining the water content of the moist sample according to the second predetermined relationship comprises, if the water-layer thickness is smaller than the minimum water-layer thickness:

determining a first relative arc length as the first arc length relative to the second arc length;

determining a second relative arc length as the third arc length relative to the second arc length; and determining the water content of the moist sample as a ratio between the minimum water content decreased by the maximum water content multiplied with the first relative arc length, and the second relative arc length.

8. The computer-implemented method according to claim 1, wherein determining the water-layer thickness within the moist sample, L, comprises minimizing $$\left\| \frac{R_s}{\|R_s\|} - \frac{R_{dry} \odot SRF(\exp(-2aL))}{\|R_{dry} \odot SRF(\exp(-2aL))\|} \right\|;$$

wherein $R_s$ is the spectral reflectance spectrum of the moist sample, $R_{dry}$ is the spectral reflectance spectrum of the air-dried sample of the porous material, SRF is the spectral response function, and a is the absorption spectrum of water.

9. The computer-implemented method according to claim 1, wherein the spectral reflectance spectrum of the moist sample comprises spectral reflectance values measured across a wavelength range of at least about 1100 nm to at most about 1700 nm.

10. The computer-implemented method according to claim 9, wherein the spectral reflectance spectrum of the moist sample comprises spectral reflectance values measured across a wavelength range of at least about 1118 nm to at most about 1656 nm.

11. The computer-implemented method according to claim 1, wherein the minimum water content and the maximum water content are selected according to an intended use of the porous material.

12. The computer-implemented method according to claim 1, further comprising:

obtaining respective hyperspectral measurements of the minimally moist sample and the maximally moist sample respectively comprising the spectral reflectance spectrum of the minimally moist sample and the maximally moist sample, and obtaining respective spectral response functions associated with the hyperspectral measurements;

determining the minimum water-layer thickness based on the spectral response function associated with the hyperspectral measurement of the minimally moist sample, the spectral reflectance spectrum of the minimally moist sample, the spectral reflectance spectrum of the air-dried sample, and the absorption spectrum of water; and determining the maximum water-layer thickness based on the spectral response function associated with the hyperspectral measurement of the maximally moist sample, the spectral reflectance spectrum of the maximally moist sample, the spectral reflectance spectrum of the air-dried sample, and the absorption spectrum of water.

13. A method for determining water content of a moist sample of porous material from a spectral reflectance spectrum of the moist sample, the method comprising:

obtaining respective hyperspectral measurements of the minimally moist sample, the maximally moist sample, and the moist sample by means of one or more hyperspectral measurement systems;

determining a minimum water content of a minimally moist sample of the porous material and a maximum water content of a maximally moist sample of the porous material; and determining the water content of the moist sample according to the computer-implemented method according to claim 1.

14. The method according to claim 13, further comprising obtaining a hyperspectral measurement of an air-dried sample of the porous material.

15. The method according to claim 13, wherein the minimum water content and the maximum water content is determined by means of gravimetric analysis; and wherein obtaining the respective hyperspectral measurements includes capturing one or more hyperspectral camera images.

16. A data processing system configured to perform the computer-implemented method according to claim 1.

* * * * *